(12) United States Patent
Lin

(10) Patent No.: US 8,386,842 B2
(45) Date of Patent: Feb. 26, 2013

(54) COMPUTER SYSTEM WITH DAMAGED BIOS DATA RECOVERING FUNCTION AND RECOVERING METHOD THEREOF

(75) Inventor: Chih-Shien Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 321 days.

(21) Appl. No.: 12/767,994

(22) Filed: Apr. 27, 2010

(65) Prior Publication Data

US 2010/0299560 A1    Nov. 25, 2010

(30) Foreign Application Priority Data

May 21, 2009   (TW) ................................ 98116943 A

(51) Int. Cl.
*G06F 11/00* (2006.01)
(52) U.S. Cl. .......................................... 714/6.31; 714/2
(58) Field of Classification Search .................. 714/6.31
See application file for complete search history.

(56) References Cited

U.S. PATENT DOCUMENTS

| | | | |
|---|---|---|---|
| 5,247,659 A | 9/1993 | Curran et al. | |
| 5,327,531 A | 7/1994 | Bealkowski et al. | |
| 6,473,856 B1 | 10/2002 | Goodwin et al. | |
| 6,934,873 B2 * | 8/2005 | Lu et al. | 714/2 |
| 7,069,431 B2 * | 6/2006 | Dayan et al. | 713/2 |
| 7,484,084 B1 * | 1/2009 | Ranaweera et al. | 713/1 |
| 8,006,062 B1 * | 8/2011 | Cheng et al. | 711/170 |
| 8,140,836 B2 * | 3/2012 | Ogawa et al. | 713/1 |
| 2002/0147941 A1 | 10/2002 | Gentile | |
| 2003/0028800 A1 * | 2/2003 | Dayan et al. | 713/200 |
| 2003/0182476 A1 * | 9/2003 | Kuo et al. | 710/8 |
| 2006/0015711 A1 * | 1/2006 | Bang | 713/2 |
| 2007/0233724 A1 * | 10/2007 | Kyoya | 707/102 |
| 2008/0126777 A1 * | 5/2008 | Chang et al. | 713/2 |
| 2009/0063840 A1 | 3/2009 | Ogawa et al. | |
| 2009/0210690 A1 * | 8/2009 | Wu et al. | 713/2 |
| 2010/0191950 A1 * | 7/2010 | Lin et al. | 713/2 |

FOREIGN PATENT DOCUMENTS

| | | |
|---|---|---|
| CN | 1423199 | 6/2003 |
| CN | 101364193 A | 2/2009 |
| TW | 200907804 A | 2/2009 |

\* cited by examiner

*Primary Examiner* — Kamini Patel
(74) *Attorney, Agent, or Firm* — Muncy, Geissler, Olds & Lowe, PLLC

(57) ABSTRACT

A computer system with a damaged BIOS data recovering function is disclosed. When BIOS data in the computer are damaged, the computer system may update and recover the BIOS of the storage unit of the computer system in a standby mode via an external electronic device (another computer or a USB flash disk). The computer system includes a storage unit, a data transferring interface, a power supply unit, and a control unit. The computer system is electrically connected with the external electronic device via the data transferring interface. The power supply unit provides standby power (in the standby mode) when the computer system is shut down. The control unit is electrically connected with the power supply unit and the data transferring interface, respectively. The control unit is actuated via the standby power, receives the external BIOS stored in the external electronic device.

7 Claims, 5 Drawing Sheets

COMPUTER SYSTEM WITH DAMAGED BIOS DATA RECOVERING FUNCTION AND RECOVERING METHOD THEREOF

CROSS REFERENCE TO RELATED APPLICATIONS

This Non-provisional application claims priority under 35 U.S.C. §119(a) on Patent Application No(s). 098116943 filed in Taiwan, Republic of China on May 21, 2009, the entire contents of which are hereby incorporated by reference.

BACKGROUND OF THE INVENTION

1. Field of Invention

The invention relates to a computer system with a damaged basic input output system (BIOS) data recovering function and a recovering method thereof.

2. Related Art

Due to fast development of information technology and the development and convenience of network communication, a computer becomes a necessary electronic product for each family.

In a common computer, a BIOS component is installed on a motherboard to be used as a communicating interface between computer hardware and the operating system, and a command program stored in the BIOS is executed to boot the computer. Consequently, if the BIOS component is failed, the computer cannot be normally booted.

When the computer cannot be normally booted due to a BIOS failure, since the user usually does not have a proper tool or relating knowledge to deal with it by him or herself, he or she often has to have the computer repaired. As a result, not only normal work of the user is affected, various kinds of tangible and intangible repair costs are also increased.

To solve the above problem, a person in the art provides a computer with two BIOSes. When one of the BIOS is failed, the command program is recovered via the other BIOS. Thus, the user does not need to have the computer repaired. However, if both of the two BIOSes are damaged, the user still has to have the computer repaired.

Consequently, it is an important subject to provide a computer system with a damaged BIOS data recovering function and a recovering method thereof to allow the user to deal with the damaged BIOS of the computer by himself or herself, and thus the cost for having the computer repaired is saved.

SUMMARY OF THE INVENTION

As a result, the invention provides a computer system with a damaged BIOS data recovering function and a recovering method thereof to allow the user to update and recover BIOS data of the computer system by him or her, and thus the cost for having the computer repaired is saved.

Consequently, the invention provides a computer system with the damaged BIOS data recovering function cooperating with external BIOS stored in an external electronic device. The computer system includes a storage unit, a data transferring interface, a power supply unit, and a control unit. The storage unit stores BIOS data. The power supply unit provides standby power when the computer system is shut down. The control unit is electrically connected with the power supply unit and the data transferring interface, respectively. When the BIOS data are damaged, the control unit is actuated via the standby power and connected with the external electronic device via the data transferring interface, and the control unit updates the BIOS data stored in the storage unit with the external BIOS.

In an embodiment of the invention, the control unit with the standby power receives the external BIOS according to a recovery signal transmitted by the external electronic device (an external computer or a universal serial bus (USB) flash disk) and updates the BIOS data stored in the storage unit of the computer system.

In an embodiment of the invention, the control unit forces the computer system to shut down according to the recovery signal.

To solve the above problem, a method for recovering damaged BIOS data according to the invention is provided, and it is adapted for a computer system having a data transferring interface, a power supply unit, a control unit, and a storage unit storing BIOS data. The recovering method includes the following steps. First, the data transferring interface is connected with an external electronic device. Second, the control unit receives external BIOS stored in the external electronic device. Third, the damaged BIOS data are updated with the external BIOS via the control unit.

In an embodiment of the invention, the external electronic device starts a recovery application to transmit a recovery signal to the control unit of the computer system.

In an embodiment of the invention, the control unit forces the computer system to shut down according to the recovery signal.

To sum up, according to a computer system with a damaged BIOS data recovering function and the recovering method thereof of the invention, a power supply unit provides standby power to the control unit to make the control unit receive the BIOS data stored in an external electronic device, update and recover the BIOS data stored in the storage unit in the computer system. As a result, the user may deal with the damaged BIOS of the computer by himself or herself, and the cost for having the computer repaired is saved.

These and other features, aspects and advantages of the present invention will become better understood with regard to the following description, appended claims, and accompanying drawings.

DETAILED DESCRIPTION OF THE INVENTION

A computer system with a damaged BIOS data recovering function and a recovering method thereof according to preferable embodiments of the invention are illustrated with accompanying relating drawings.

Figure 1:
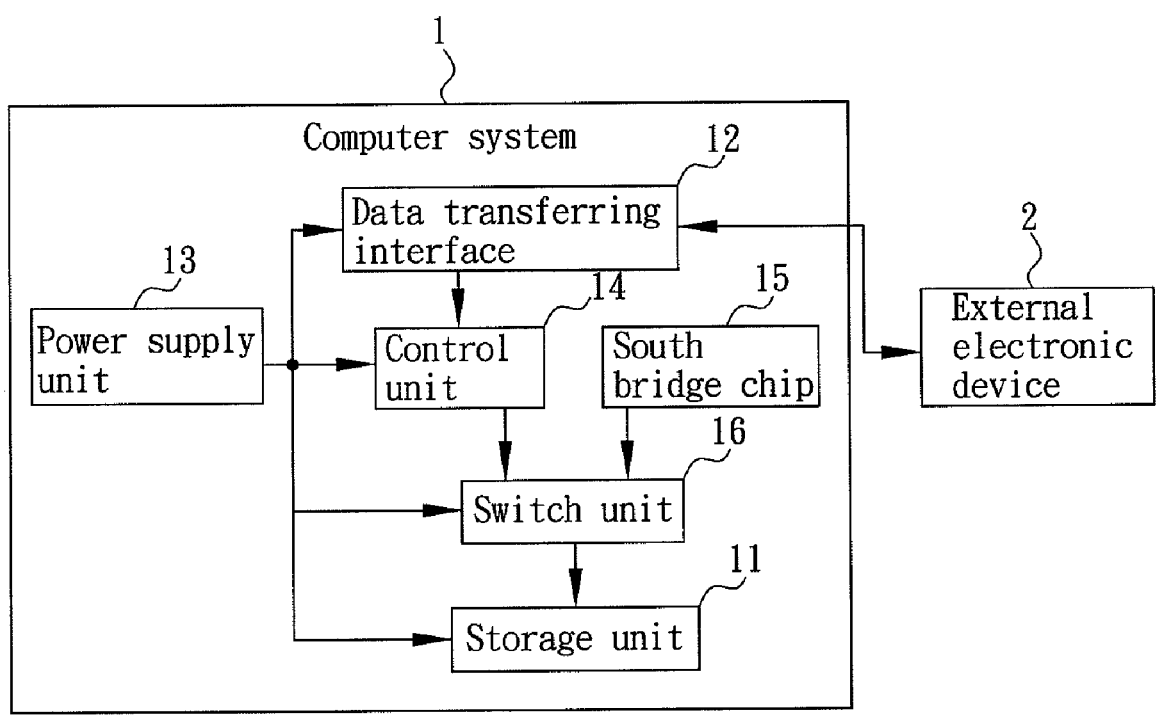
FIG. 1 is a schematic diagram showing a computer system with a damaged BIOS data recovering function and an external electronic device according to a preferable embodiment of the invention.

FIG. 1 is a schematic diagram showing a computer system with a damaged BIOS data recovering function and an external electronic device according to a preferable embodiment of the invention. A computer system 1 includes a storage unit 11, a data transferring interface 12, a power supply unit 13, and a control unit 14.

When BIOS data stored in the storage unit 11 of the computer system 1 are damaged, the BIOS data stored in the storage unit 11 of the computer system 1 may be updated and recovered via external BIOS stored in an external electronic device 2. In this embodiment, the external electronic device 2 may be a desktop computer, a notebook computer, a portable storage device, or one of other electronic devices (such as a portable flash drive) with a data storage function. Furthermore, the BIOS data of the computer system 1 may be damaged due to virus attacks or a BIOS updating failure, and the computer system 1 cannot be normally booted. Therefore, the BIOS should be updated and recovered with the help of the external electronic device 2 to make the computer system 1 normally booted.

In this embodiment, the computer system 1 may be connected with the external electronic device 2 via the data transferring interface 12. The external electronic device 2 may transfer the external BIOS to the computer system 1 via the data transferring interface 12 to update the BIOS data of the computer system 1. The data transferring interface 12 may be a universal serial bus (USB) interface.

In this embodiment, the power supply unit 13 provides standby power when the computer system 1 is shut down. Additionally, the power supply unit 13 provides operating power for components of the computer system, respectively, when the computer system 1 is booted or operates.

The control unit 14 is electrically connected with the data transferring interface 12 and the power supply unit 13, respectively. In this embodiment, the control unit 14 is actuated according to the standby power provided by the power supply unit 13 and receives the external BIOS stored in the external electronic device 2 to input the external BIOS stored in the external electronic device 2 to the storage unit 11. The external BIOS are inputted to the storage unit 11 may be realized by updating the original BIOS data of the computer system 1 with the external BIOS.

In practical usage, the control unit 14 may be an embedded control unit according to user's requirement, and the control unit 14 may have a serial peripheral interface (SPI) or a low pin count (LPC) interface.

Furthermore, in this embodiment, when the external electronic device 2 is electrically connected with the data transferring interface 12 of the computer system 1, the external electronic device 2 transmits a recovery signal. The control unit 14 may receive the external BIOS stored in the external electronic device 2 according to the recovery signal transmitted by the external electronic device 2. Moreover, the control unit 14 may force the computer system 1 to shut down according to the recovery signal.

Additionally, the computer system 1 may further include a south bridge chip 15 and a switch unit 16. The switch unit 16 is electrically connected with the south bridge chip 15, the control unit 14, and the storage unit 11, respectively.

In this embodiment, when the control unit 14 forces the computer system 1 to shut down according to the recovery signal of the external electronic device 2, the switch unit 16 makes the control unit 14 conduct with the storage unit 11, and the control unit 14 recovers and updates the BIOS data stored in the storage unit 11 of the computer system 1 according to the received external BIOS transferred by the external electronic device 2. Furthermore, when the control unit 14 does not force the computer system 1 to shut down, the switch unit 16 makes the south bridge chip 15 conducts with the storage unit 11. In other words, the switch unit 16 is used for switching a conducting relationship between the storage unit 11, the south bridge chip 15, and the control unit 14. Before the control unit 14 recovers and updates the BIOS data, the switch unit 16 makes the control unit 14 conducts with the storage unit 11 to input the external BIOS stored in the external electronic device 2 to the storage unit 11 of the computer system 1.

Figure 2:
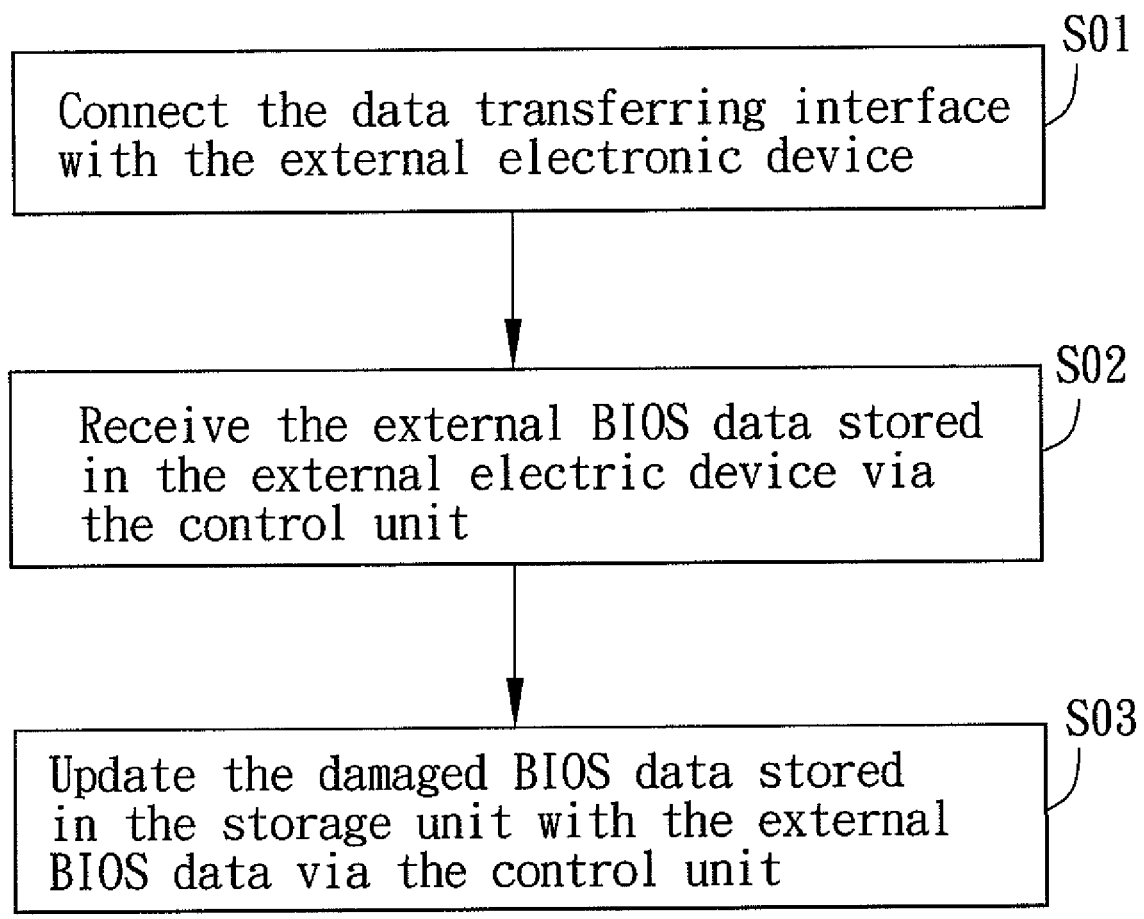
FIG. 2 is a flow chart showing a recovering method for a computer system according to a preferable embodiment of the invention.

A recovering method according to a preferable embodiment of the invention is illustrated with an accompanying flow chart in FIG. 2 cooperating with FIG. 1, and it may be used with the computer system 1. The recovering method of the computer system includes the following steps S01 to S03.

In step S01, the data transferring interface 12 is connected with the external electronic device 2.

In step S02, the control unit 14 receives the external BIOS stored in the external electronic device 2.

In step S03, the damaged BIOS data stored in the storage unit 11 is updated with the external BIOS via the control unit 14.

Furthermore, the computer system with the damaged BIOS data recovering function and the recovering method thereof according to preferable embodiments of the invention are further illustrated with following two embodiments.

First Embodiment

Figure 3A:
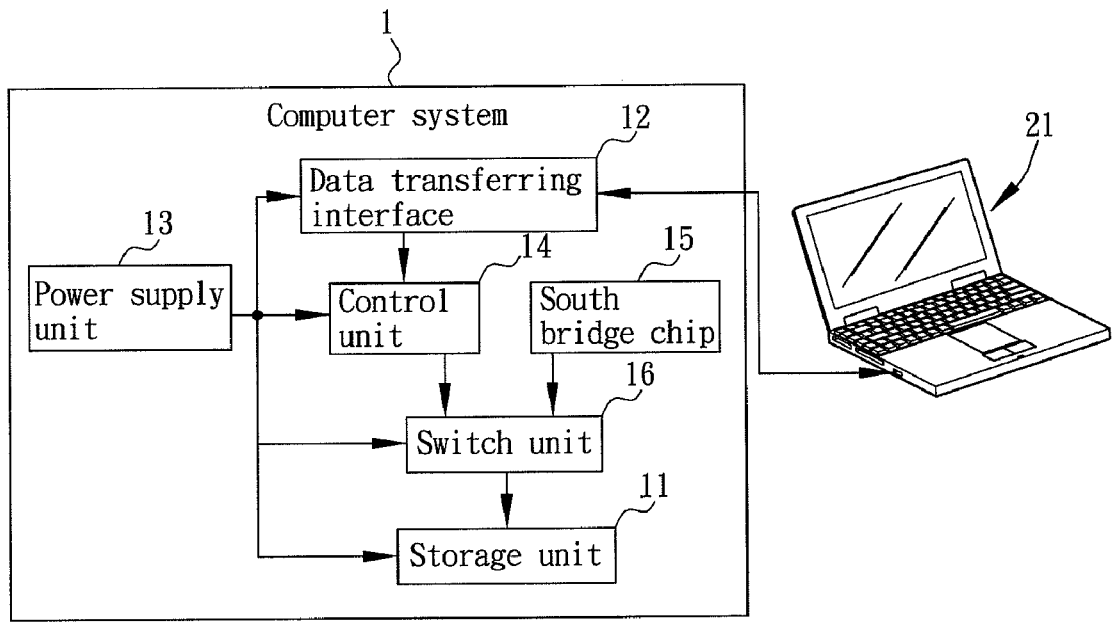
FIG. 3A is a schematic diagram showing that a computer system is connected with an external computer and updates BIOS data of the computer system according to a first embodiment of the invention.

In FIG. 3A, in this embodiment, the external electronic device cooperating with the computer system 1 is an external computer 21. The external computer 21 may be a desktop computer or a notebook computer. In this embodiment, the external computer 21 is the notebook computer, but the invention is not limited thereto.

Figure 4A:
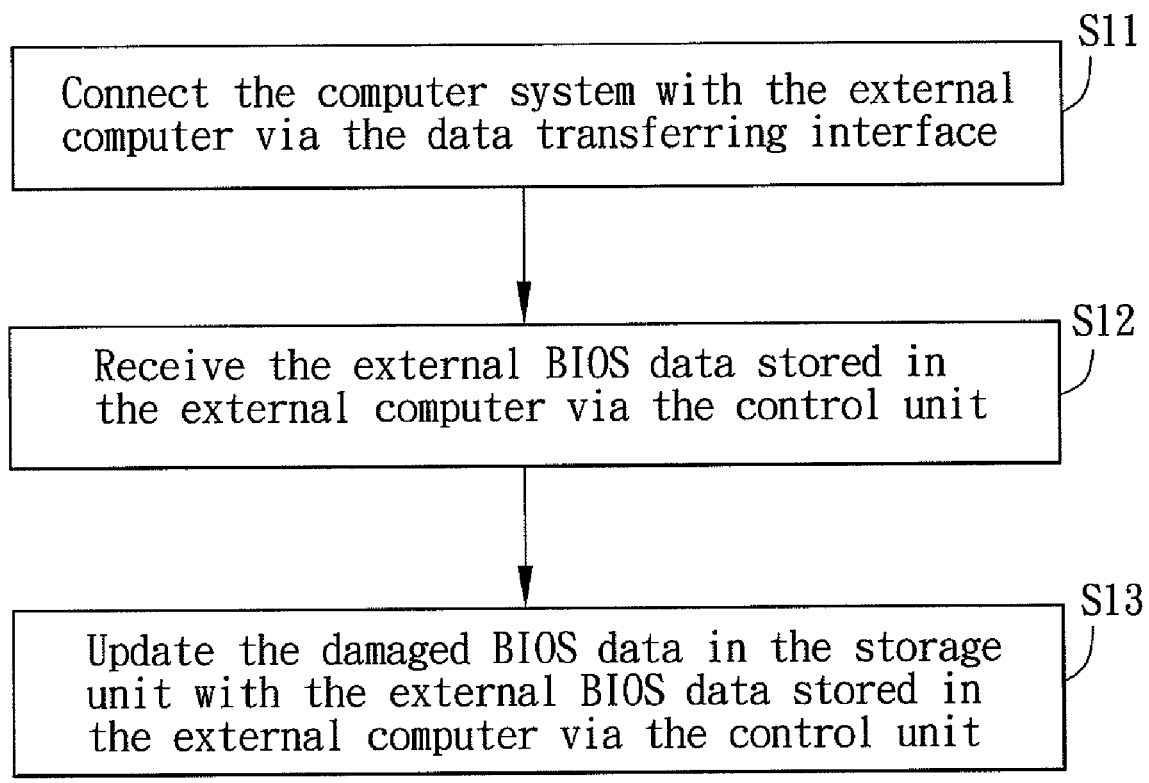
FIG. 4A is a flow chart showing a recovering method for a computer system according to a first embodiment of the invention.

As shown in the flow chart in FIG. 4A cooperating with FIG. 3A, the recovering method may be used with the cooperation of the computer system 1 and the external computer 21. The recovering method of the computer system includes the following steps S11 to step S13.

In step S11, the computer system 1 is connected with the external computer 21 via the data transferring interface 12. In practical usage, when the user operates the computer system 1 with the damaged BIOS data recovering function, if the BIOS of the computer system 1 is damaged and the computer system 1 cannot be normally booted, a USB cable may be used to electrically connect the external computer 21.

In step S12, the control unit 14 receives the external BIOS stored in the external computer 21. In practical usage, after the external computer 21 is electrically connected with the data transferring interface 12, the external computer 21 is booted to enter a normally operating mode. At that moment, the external computer 21 may start a recovery application automatically or manually to communicate with the control unit 14 of the computer system 1. After the external computer 21 confirms the BIOS data needed by the computer system 1, the external computer 21 transmits the recovery signal to the control unit 14 of the computer system 1. After the control unit 14 receives the recovery signal, it informs the external computer 21 to transfer the BIOS data needed in normally booting, and the control unit 14 receives the BIOS data. Afterward, the control unit 14 forces the computer system 1 to shut down according to the recovery signal, and the power supply unit 13 provides standby power to the control unit 14.

In step 13, the damaged BIOS data in the storage unit 11 is updated with the external BIOS stored in the external computer 21 via the control unit 14. In practical usage, the control unit 14 burns the external BIOS to the storage unit 11 to update the BIOS data in the storage unit 11.

Moreover, to avoid an error caused by noise interference when the BIOS data are updated, the switch unit 16 of the computer system 1 may be used to switch an interface signal line of the storage unit 11 to make the interface signal line only conduct with the control unit 14.

In practical usage, after the control unit 14 updates the BIOS data, a monitor of the external computer 21 displays a finish message to tell the user that the storage unit 11 of the computer system 1 are recovered and the computer system 1 may be normally booted.

Additionally, if the computer system 1 is shut down before the BIOS are recovered; the control unit 14 does not need to force the computer system 1 to shut down. Furthermore, when the computer system 1 is shut down, the power supply unit 13 provides the standby power to the control unit 14.

Via the hardware configuration and the recovering method as stated above, the user may almost full-automatically recover the BIOS data just with another computer. The control unit may receive the external BIOS and update the original BIOS data in the storage unit with the external BIOS via the standby power provided by the power supply unit. Thus, the user may easily solve the problem that the BIOS of the computer are damaged.

Second Embodiment

In FIG. 3A, in this embodiment, the computer system 1 cooperates with a portable storage device 22. In this embodiment, the portable storage device 22 is a flash disk, but the invention is not limited thereto.

Figure 3B:
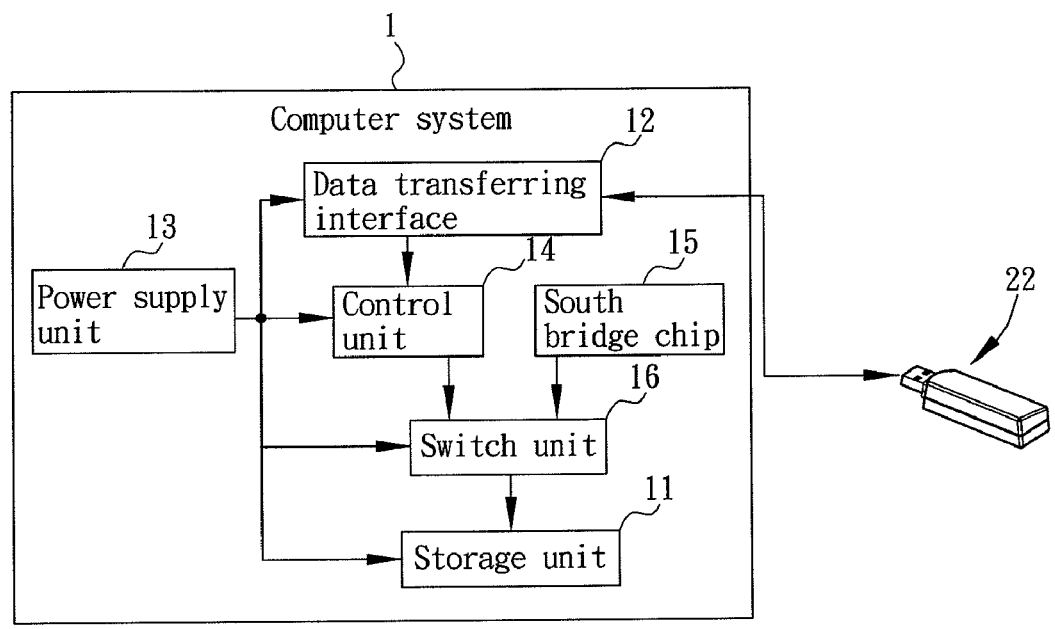
FIG. 3B is a schematic diagram showing that a computer system is connected with an portable storage unit and updates BIOS data of the computer system according to a second embodiment of the invention.
Figure 4B:
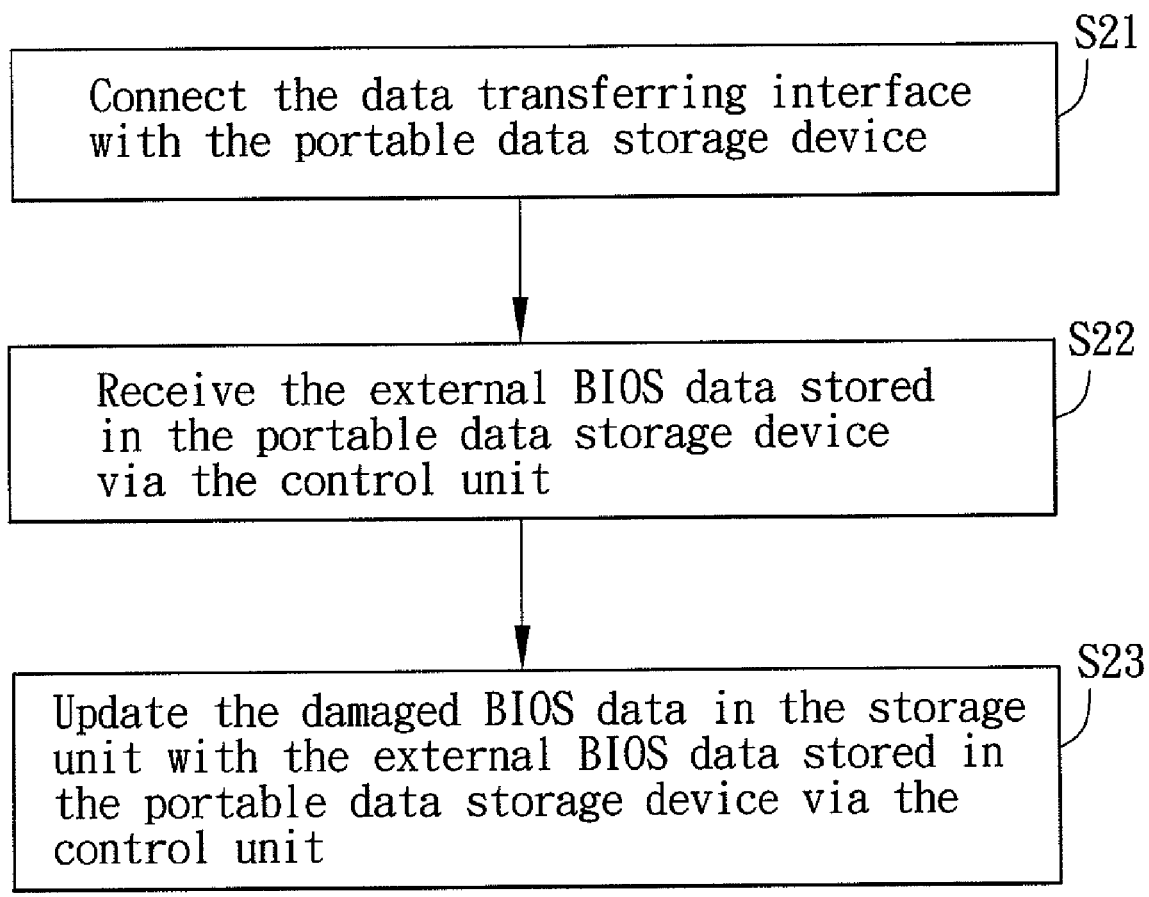
FIG. 4B is a flow chart showing a recovering method for a computer system according to a second embodiment of the invention.

As shown in the flow chart in FIG. 4B cooperating with FIG. 3B, the recovering method according to the second preferable embodiment of the invention is provided, and it is used with the cooperation of the computer system 1 and the portable storage device 22. The recovering method of the computer system includes the following steps S21 to S23.

In step S21, the data transferring interface 12 is connected with the portable storage device 22.

In step S22, the control unit 14 receives the external BIOS stored in the portable storage device 22. In practical usage, after the portable storage device 22 is electrically connected with the data transferring interface 12, the control unit 14 executes a recovery application and transmits a recovery signal to the portable storage device 22 to search for the external BIOS stored in the portable storage device 22 and receive the external BIOS. Furthermore, the control unit 14 forces the computer system 1 to shut down according to the recovery signal, and the power supply unit 13 provides standby power to the control unit 14.

In step S23, the damaged BIOS data in the storage unit 11 is updated with the external BIOS stored in the portable storage device 22 via the control unit 14. Moreover, to avoid noise interference when the BIOS data are updated, the switch unit 16 of the computer system 1 may be used to switch the interface signal line of the storage unit 11 to make the interface signal line only conduct with the control unit 14.

Additionally, in practical usage, if the computer system 1 is shut down before the BIOS are recovered; the control unit 14 does not need to force the computer system 1 to shut down. Furthermore, when the computer system 1 is shut down, the power supply unit 13 provides the standby power to the control unit 14.

Via the hardware configuration and the recovering method as stated above, the user may recover the BIOS data of the computer system only with a portable storage device. As a result, various kinds of costs for having the computer repaired are saved.

To sum up, according to a computer system with a damaged BIOS data recovering function and a recovering method thereof of the invention, a power supply unit provides standby power to the control unit to make the control unit receive the BIOS data stored in the external electronic device and input the external BIOS data to the BIOS. As a result, the user may deal with the damaged BIOS of the computer by himself or herself, and the cost for having the computer repaired is saved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A computer system with a damaged BIOS data recovering function, cooperating with external BIOS stored in an external electronic device, the computer system comprising:
    a south bridge chip;
    a switch unit electrically connected with the south bridge chip, the control unit, and the storage unit, respectively;
    a storage unit storing BIOS data;
    a data transferring interface;
    a power supply unit providing standby power when the computer system is shut down; and
    a control unit electrically connected with the power supply unit and the data transferring interface;
    when the BIOS data are damaged, the control unit is actuated via the standby power and connected with the external electronic device via the data transferring interface, the switch unit makes the control unit to conduct with the storage unit and the control unit updates the BIOS data stored in the storage unit with the external BIOS according to a recovery signal transmitted by the external BIOS and the computer system shuts down according to the recovery signal, when the control unit does not force the computer system to shut down, the switch unit makes the south bridge chip to conduct with the storage unit.

2. The computer system according to claim 1, wherein the external electronic device is an external computer or a portable storage device.

3. The computer system according to claim 1, wherein the control unit is an embedded control unit.

4. The computer system according to claim 1, wherein the control unit has a serial peripheral interface (SPI) or a low pin count (LPC) interface.

5. A method for recovering damaged BIOS data, adapted for a computer system having a data transferring interface, a power supply unit, a control unit, a south bridge chip, a storage unit storing BIOS data and a switch unit electrically connected with the south bridge chip, the control unit, and the storage unit, respectively, the method comprising:
    connecting the data transferring interface with an external electronic device;
    receiving external BIOS stored in the external electronic device via the control unit; and
    updating the damaged BIOS data via the control unit according to a recovery signal transmitted by the external BIOS and the computer system shuts down according to the recovery signal,
    wherein the switch. unit makes the control unit to conduct with the storage unit for storing the BIOS data after the control unit forces the computer system to shut down, wherein the switch unit makes the south bridge chip to conduct with the storage unit while the control unit does not force the computer system to shut down.

6. The method according to claim 5, wherein the external electronic device is an external computer or a portable storage device.

7. The method according to claim 5, wherein the external electronic device starts a recovery application to transmit the recovery signal to the control unit of the computer system.

* * * * *